United States Patent
Zheng et al.

(10) Patent No.: US 9,899,168 B2
(45) Date of Patent: Feb. 20, 2018

(54) ARC ELIMINATOR WITH EARTH CONTACT

(71) Applicant: LSIS CO., LTD., Anyang-si, Gyeonggi-do (KR)

(72) Inventors: Menglei Zheng, Anyang-si (KR); Youngwoo Jeong, Anyang-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 0 days.

(21) Appl. No.: 15/406,693

(22) Filed: Jan. 14, 2017

(65) Prior Publication Data
US 2017/0271110 A1 Sep. 21, 2017

(30) Foreign Application Priority Data

Mar. 15, 2016 (KR) .................. 20-2016-0001386 U

(51) Int. Cl.
*H01H 1/04* (2006.01)
*H01H 33/04* (2006.01)
*H02B 1/04* (2006.01)
*H02B 1/16* (2006.01)
*H01H 33/53* (2006.01)

(52) U.S. Cl.
CPC ............ *H01H 33/04* (2013.01); *H01H 33/53* (2013.01); *H02B 1/04* (2013.01); *H02B 1/16* (2013.01)

(58) Field of Classification Search
CPC .... H01R 13/24; H01R 13/523; H01R 13/631; H01R 13/652; H01R 13/6582; H01R 13/6591; H01R 13/7035; H01R 2107/00; H01R 2201/26; H01R 24/60; H01R 4/48
See application file for complete search history.

(56) References Cited

U.S. PATENT DOCUMENTS 3,023,292 A * 2/1962 Stewart .................... H01H 1/22
200/254
3,171,926 A * 3/1965 Schwab .................. H01H 9/10
218/152

(Continued)

FOREIGN PATENT DOCUMENTS

DE        20020401        4/2002
EP        0565356         10/1993

(Continued)

OTHER PUBLICATIONS

Korean Intellectual Property Office Search Report dated Apr. 25, 2016, 8 pages.

(Continued)

*Primary Examiner* — Truc Nguyen
(74) *Attorney, Agent, or Firm* — K&L Gates LLP

(57) ABSTRACT

The present invention relates to an arc eliminator, and more particularly, to an arc eliminator with an earth contact. An arc eliminator comprises: a housing; an extinguisher installed on the housing; and an earth contact that is installed on the housing and protrudes out from the housing in such a way as to be connected to the ground bus bar provided inside a distribution board when the extinguisher is moved to a first position where the extinguisher is connected to a fixed bus bar provided inside the distribution board, and to be disconnected from the ground bus bar when the extinguisher is moved to a second position where the extinguisher is disconnected from the fixed bus bar.

7 Claims, 8 Drawing Sheets

(56) References Cited

U.S. PATENT DOCUMENTS

| | | | | |
|---|---|---|---|---|
| 3,823,288 | A | * | 7/1974 | Wilson ................ H01H 33/666 200/50.23 |
| 4,007,346 | A | * | 2/1977 | Gaigg ................ H02B 13/065 218/24 |
| 4,218,596 | A | * | 8/1980 | Clausing ............ H01H 71/0214 200/304 |
| 4,933,519 | A | * | 6/1990 | Milianowicz ............ H01H 1/50 200/255 |
| 2004/0104201 | A1 | * | 6/2004 | Sato ................... H01H 33/6661 218/118 |
| 2006/0219665 | A1 | * | 10/2006 | Zhou ..................... H01H 9/168 218/122 |
| 2007/0175866 | A1 | * | 8/2007 | Tsuchiya .............. H01H 31/003 218/10 |
| 2010/0089874 | A1 | * | 4/2010 | Morita ..................... H01H 9/22 218/154 |

FOREIGN PATENT DOCUMENTS

| | | |
|---|---|---|
| EP | 1432090 | 6/2004 |
| EP | 2541704 | 1/2013 |
| KR | 100319407 | 1/2002 |
| KR | 100932232 | 12/2009 |
| KR | 1020100102488 | 9/2010 |
| KR | 101110533 | 1/2012 |
| KR | 101229746 | 2/2013 |
| WO | 2011116985 | 9/2011 |
| WO | 2015178160 | 11/2015 |

OTHER PUBLICATIONS

European Patent Office Application Serial No. 16203537.2, Search Report dated May 26, 2017, 6 pages.

Korean Intellectual Property Office Application No. 20-2016-0001386, Office Action dated May 22, 2017, 49 pages.

* cited by examiner

ARC ELIMINATOR WITH EARTH CONTACT

CROSS-REFERENCE TO RELATED APPLICATION

Pursuant to 35 U.S.C. § 119(a), this application claims the benefit of earlier filing date and right of priority to Korean Application No. 20-2016-0001386, filed on Mar. 15, 2016, the contents of which are all hereby incorporated by reference herein in its entirety.

BACKGROUND OF THE INVENTION

1. Field of the Invention

The present invention relates to an arc eliminator, and more particularly, to an arc eliminator with an earth contact.

2. Description of the Conventional Art

In general, a distribution board is a piece of equipment that gets electric power and supplies electric power required by a load installed on an electrical receptor (customer). The distribution board may convert high-voltage power to low-voltage power and distribute it. The distribution board may be equipped with switches, an arrester, a transformer, breakers, various types of measuring instruments, etc.

An arc eliminator may be installed inside the distribution board. An arc eliminator that can be inserted into or taken out from the distribution board is called a drawable arc eliminator. The drawable arc eliminator is connected to a bus bar and ground bus bar in the distribution board. When in the in position, the (drawer-type) arc eliminator, if in the normal state, keeps two electrodes (a high-voltage electrode and a ground electrode) in it insulated in an open (or non-conducting) state, and quickly makes the two electrodes conductive when an arc fault occurs in the distribution board so as to ground the circuit by a three-phase short circuit and eliminate the arc.

The ground bus bar may be held in place inside the distribution board, and a ground member or grounding cable may be installed in the arc eliminator in order for it to be connected to the ground bus bar.

As an example of connecting the arc eliminator to ground, the ground member installed in the arc eliminator may be connected to the ground bus bar in the distribution board with a fastening member such as a bolt.

As another example of connecting the arc eliminator to ground, the grounding cable connected to the arc eliminator may be connected to the ground bus bar in the distribution board and then fixed to the ground bus bar with a screw.

However, these methods of ground connection for the arc eliminator require loosening the bolt and then fastening it again or connecting the grounding cable again to the ground bus bar, when mounting the arc eliminator after testing it, and carry a high risk of falling out if the connection is unstable.

SUMMARY OF THE INVENTION

An aspect of the present invention is to provide a distribution board which allows an arc eliminator to be connected to ground by moving the arc eliminator and which provides high reliability when mounting the arc eliminator.

An exemplary embodiment of the present invention provides an arc eliminator comprising: a housing; an extinguisher installed on the housing; and an earth contact that is installed on the housing and protrudes out from the housing in such a way as to be connected to the ground bus bar provided inside a distribution board when the extinguisher is moved to a first position where the extinguisher is connected to a fixed bus bar provided inside the distribution board, and to be disconnected from the ground bus bar when the extinguisher is moved to a second position where the extinguisher is disconnected from the fixed bus bar.

The earth contact comprises: a fixed ground member; and a movable ground member having a first contact portion in constant contact with the fixed ground member and a second contact portion in selective contact with the ground bus bar.

The second contact portion makes contact with the ground bus bar when in the first position, and is disconnected from the ground bus bar when in the second position.

The earth contact may further comprise: a connecting member that connects the movable ground member to the fixed ground member; and an elastic member that is installed between the connecting member and the movable ground member and elastically supports the movable ground member.

A pair of movable ground members may be placed to face each other, and part of the fixed ground member may be positioned between the pair of movable ground members.

The elastic member may comprise: a first elastic member that pushes one of the pair of movable ground members towards the other movable ground member; and a second elastic member that pushes the other movable ground member towards one of the pair of movable ground members.

The arc eliminator may further comprise an earth contact support that is installed on the housing and supports the earth contact.

The earth contact may comprise: a vertical portion that is vertically long; and a horizontal portion that is bent horizontally from the top of the vertical portion and spaced apart from the housing and makes contact with a ground bus bar.

According to the exemplary embodiment of the present invention, the earth contact of the arc eliminator is connected to or disconnected from the ground bus bar when the arc eliminator is moved to the first position where the extinguisher and the fixed bus bar are connected together or the second position where the extinguisher and the fixed bus bar are disconnected from each other. Thus, no extra work is required to connect the arc eliminator to ground, and the arc eliminator can be easily connected to ground.

Moreover, it is possible to minimize the effort needed to align the earth contact and the ground bus bar when inserting the arc eliminator, because the direction of connecting or disconnecting the earth contact and the ground bus bar matches the direction of inserting the arc eliminator or taking it out.

In addition, the movable ground member and the ground bus bar may remain in close contact with each other with high reliability since the movable ground member is pushed towards the ground bus bar by the elastic member.

Furthermore, the earth contact and the ground bus bar can be connected to each other with high reliability since the ground bus bar slides in between a pair of movable ground members and makes contact with each of them.

Besides, the initial insertion of the ground bus bar between the pair of movable ground members can be made easy, and the effort required to align the earth contact and the ground bus bar can be minimized.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, a concrete embodiment of the present invention will be described in detail with reference to the drawings.

Figure 1:
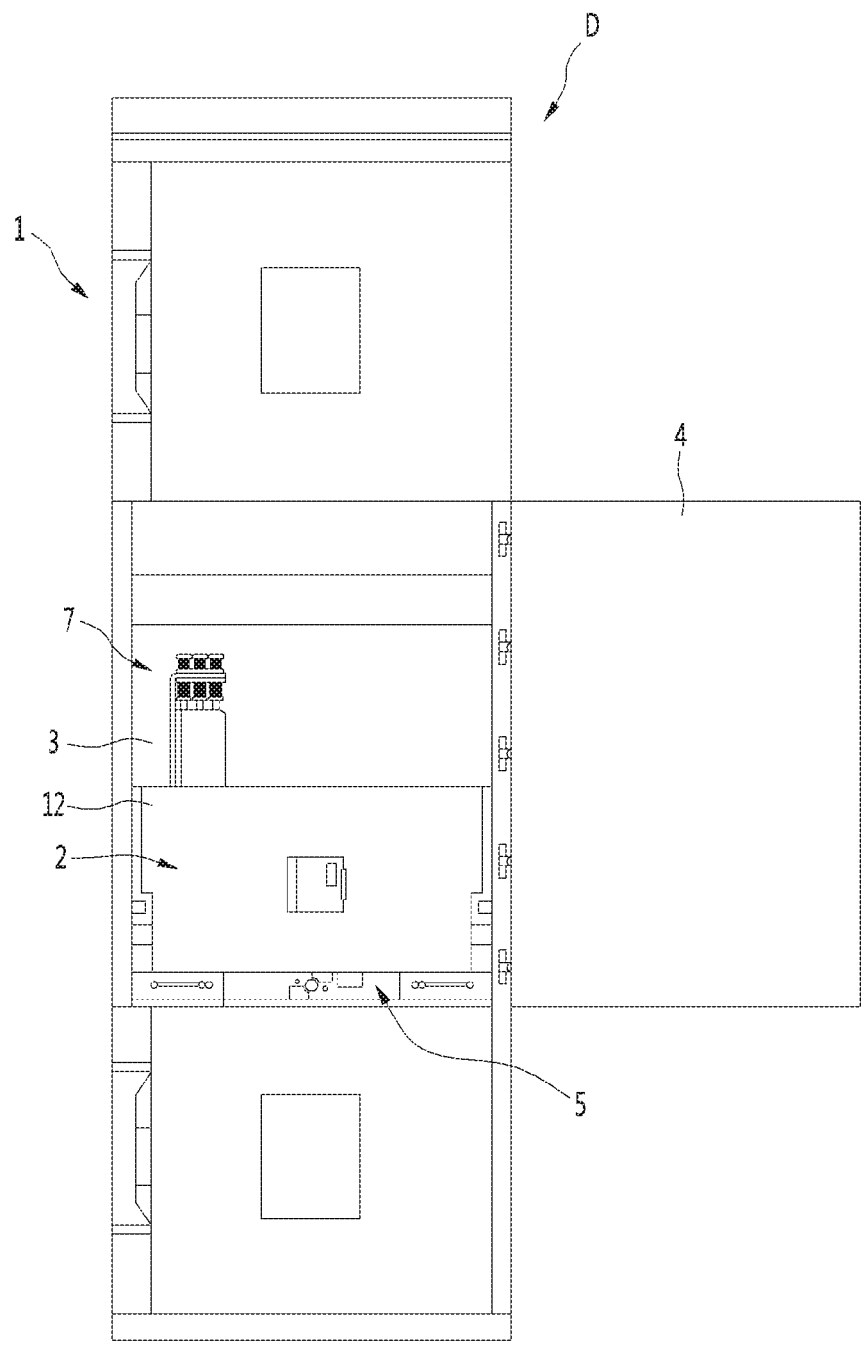
FIG. 1 is a front view of a distribution board with an arc eliminator installed in it according to an exemplary embodiment of the present invention.
Figure 2:
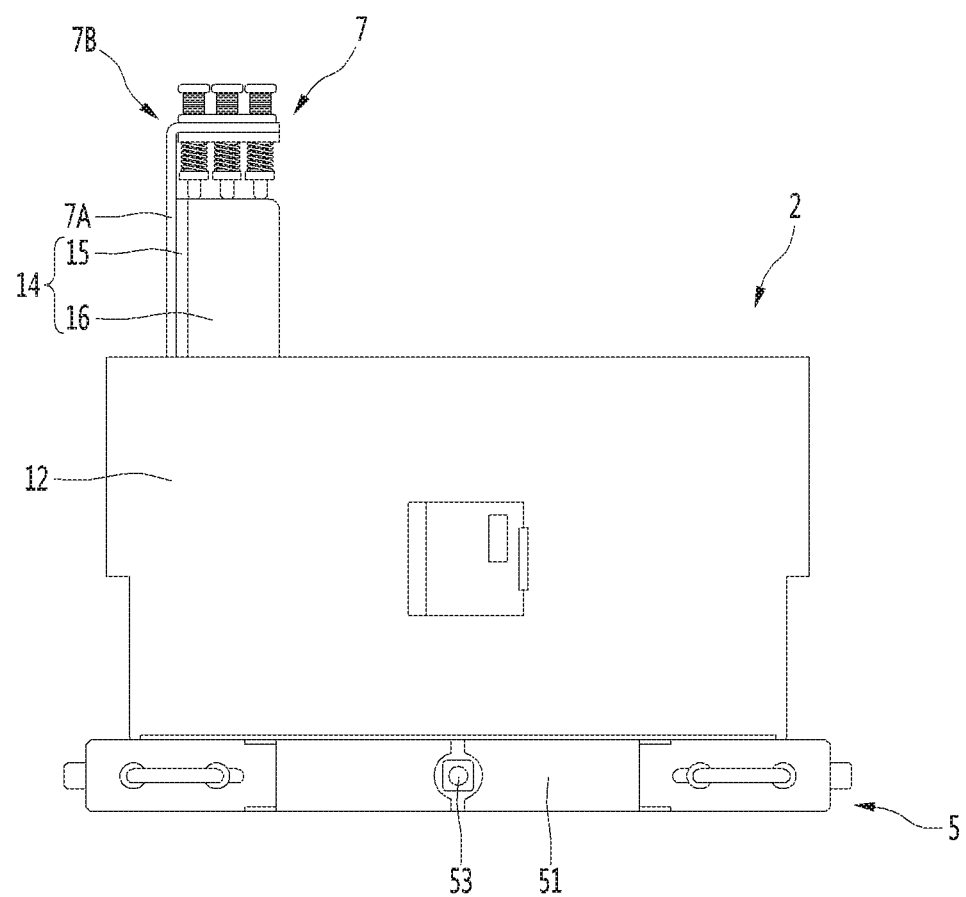
FIG. 2 is an enlarged front view illustrating the arc eliminator according to the exemplary embodiment of the present invention.
Figure 3:
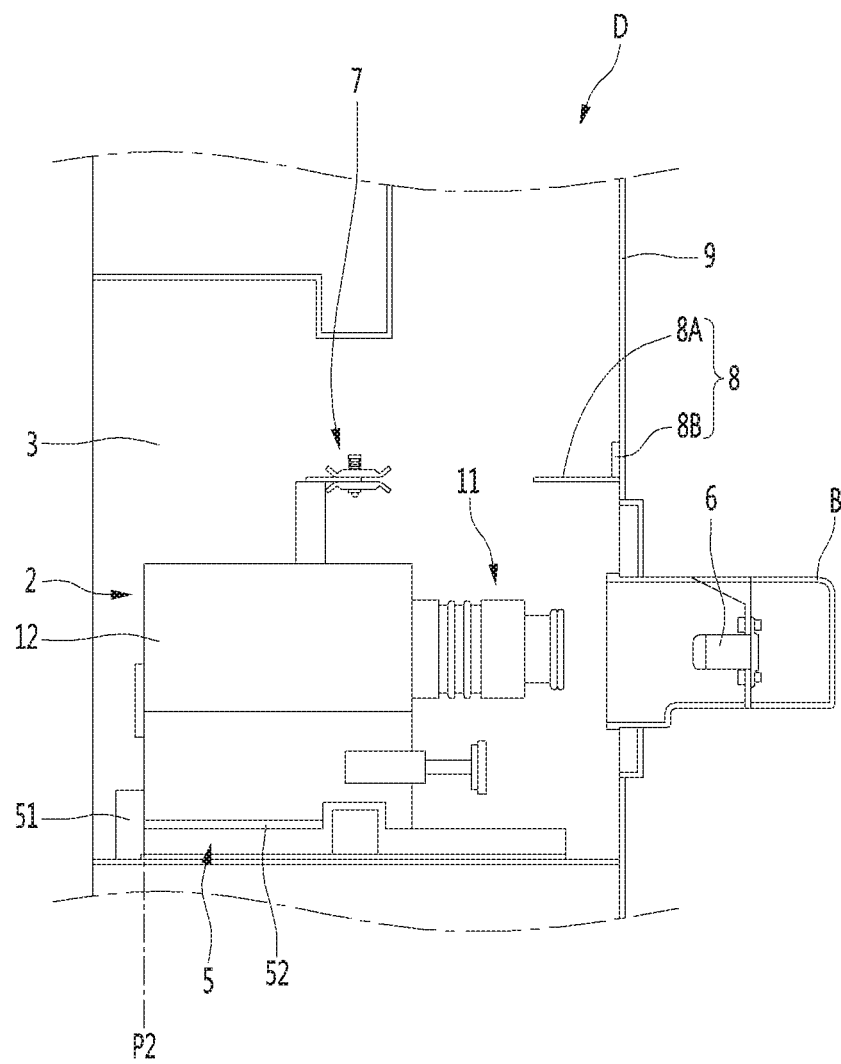
FIG. 3 is a side view illustrating the inside of the distribution board when the arc eliminator is in the in position according to the exemplary embodiment of the present invention.
Figure 4:
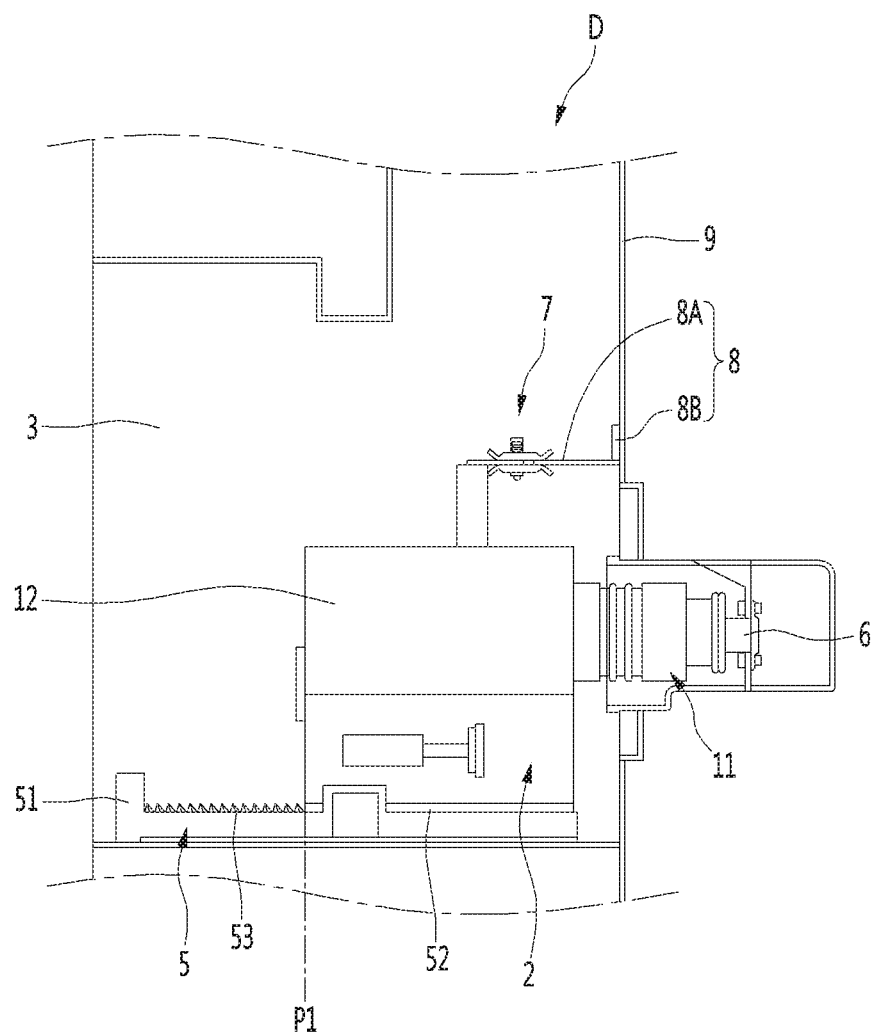
FIG. 4 is a side view illustrating the inside of the distribution board when the arc eliminator is in the out position according to the exemplary embodiment of the present invention.

FIG. 1 is a front view of a distribution board with an arc eliminator installed in it according to an exemplary embodiment of the present invention. FIG. 2 is an enlarged front view illustrating the arc eliminator according to the exemplary embodiment of the present invention. FIG. 3 is a side view illustrating the inside of the distribution board when the arc eliminator is in the in position according to the exemplary embodiment of the present invention. FIG. 4 is a side view illustrating the inside of the distribution board when the arc eliminator is in the out position according to the exemplary embodiment of the present invention.

A distribution board D may comprise a case 1 forming the outer appearance. The case 1 may be composed of an assembly of a plurality of members. The case 1 may comprise a base, a frame installed on the top side of the base, and an outer cover attached to the frame. At least one panel that splits the interior of the case 1 into multiple spaces may be installed inside the case 1.

The case 1 may have space in it, and various types of devices constituting the distribution board D, such as switches, an arrester, a transformer, an arc eliminator 2, different types of sensors, etc., may be housed in the space in the case 1.

The arc eliminator 2 may comprise an extinguisher 11 capable of extinguishing an arc.

The case 1 may have an arc eliminator receptacle 3 that can contain the arc eliminator 2, and the arc eliminator 2 may be movably positioned in the arc eliminator receptacle 3.

The distribution board D may further comprise an arc eliminator door 4 for opening and closing the arc eliminator receptacle 3. The arc eliminator door 4 may be installed on the case 1 to rotate on one of the left and right sides and open and close the arc eliminator receptacle 3.

The distribution board D may further comprise a transport module 5 for moving the arc eliminator 2. The arc eliminator 2 may be moved by the transport module 5, while being placed on the transport module 5. The arc eliminator 2 on the transport module 5 may move backward to the in position or forward to the out position.

The transport module 5 may comprise a front body 51 installed movably on the arc eliminator receptacle 3, and a truck 52 positioned at the back of the front body 51 to move back and forth. An lead screw 53 that can be turned by a handle (not shown) may be rotatably placed on the front body 51. An outer gear (not shown) meshing with the lead screw 53 may be mounted on the truck 52. The outer gear may be mounted on the truck 52 in a way that encloses part of the lead screw 53. As the lead screw turns, the truck 52 may move forward or backward in the direction that the lead screw 53 turns.

When the truck 52 moves forward, the arc eliminator 2 placed on the truck 52 may move forward along with the truck 52. Also, when the truck 52 moves backward, the arc eliminator 2 placed on the truck 52 may move backward along with the truck 52.

As illustrated in FIGS. 3 and 4, a fixed bus bar 6 (fixed bus bar for the distribution board) which the extinguisher 11 is connected to or disconnected from may be provided inside the distribution board D. The fixing bus bar 6 may be installed within a bushing B into which extinguisher 11 is inserted. The bushing B may be installed on a panel 9 installed inside the case 1. Here, the panel 9 with the bushing B installed on it may be a panel forming the arc eliminator receptacle that splits the interior of the case 1 into the arc eliminator receptacle 3 at the front and a bus bar compartment at the rear, with its front side facing the arc eliminator 2. The fixed bus bar 6 may be mounted on a fixed bus bar support installed within the bushing B.

The extinguisher 11 may be provided at the rear part of the arc eliminator 2 and protrude backward. The extinguisher 11 and the fixed bus bar 6 may be disconnected from each other, while the arc eliminator 2 is in the forward position as shown in FIG. 3. Tests such as performance testing may be conducted while the arc eliminator 2 is in the forward position as shown in FIG. 3. As such, when the extinguisher 11 is disconnected from the fixed bus bar 6, the arc eliminator 2 may be in the test position (second position) where the arc eliminator 2 can be tested, or in the out position where the arc eliminator 2 is taken out from the fixed bus bar 6.

When the arc eliminator 2 is in the backward position as shown in FIG. 3, the extinguisher 11 and the fixed bus bar 6 may be connected to each other. The arc eliminator 2 may operate, while it is in the backward position as shown in FIG. 3. As such, when the extinguisher 11 is connected to the fixed bus bar 6, the arc eliminator 2 may be in the service position (first position) where the arc eliminator 2 can be used, or in the in position where the arc eliminator 2 is inserted into the fixed bus bar 6.

An earth contact 7 may be provided on one side of the arc eliminator 2. The earth contact 7 may be placed to protrude out from the arc eliminator 2. The earth contact 7 may be placed to protrude from the top of the arc eliminator 2. The arc eliminator 2 may comprise a housing 12 with a space in it. The housing 12 may form the outer appearance of the arc eliminator 2. The earth contact 7 may be installed to protrude from the top of the housing 12.

The earth contact 7 may comprise: a vertical portion 7A that is vertically long; and a horizontal portion 7B that is bent horizontally from the top of the vertical portion 7A and spaced apart from the housing 12 and makes contact with a ground bus bar 8.

The vertical portion 7A may be vertically long so that the horizontal portion 7B is spaced apart from the housing 12.

The horizontal portion 7B may be composed of an assembly of a plurality of members. At least one of the plurality of members of the horizontal portion 7B may make contact with the ground bus bar 8 and be connected to ground.

The arc eliminator 2 may further comprise an earth contact support 14 that supports the earth contact 7.

The earth contact support 14 may be placed in contact with the vertical portion 7A so as to support the earth contact 7. The earth contact support 14 may have a three-dimensional shape. The earth contact support 14 may be placed side by side with the vertical portion 7A, and may comprise a first supporter 15 that makes contact with the vertical portion 7A and supports the vertical portion 7A, and a second support 16 that protrudes from the first support 15 and supports the first support 15.

The ground bus bar 8 (ground bus bar for the distribution board) connected to the earth contact 7 may be provided inside the distribution board D.

The ground bus bar 8 may be placed apart from the fixed bus bar 6. The ground bus bar 8 may be installed on the panel 9 installed inside the case 1. The ground bus bar 8 may be installed on the panel 9 where the bushing B is installed.

The ground bus bar 8 may comprise a contact portion 8A and a fixed portion 8B.

The contact portion 8A may be placed in contact with the earth contact 7. The contact portion 8A may protrude from one side of the fixed portion 8B to the arch eliminator receptacle 3, and may be placed in the arc eliminator receptacle 3 to run horizontally.

The fixed portion 8B may be at right angles to the contact portion 8A, and may be mounted on the panel 9 inside the distribution board D. The fixed portion 8B may be fastened to the panel 9 inside the distribution board D by a fastening member such as a screw.

The earth contact 7 thus configured may move along with the arc eliminator 7 when the arc eliminator 2 moves.

When the arc eliminator 2 is in the backward position (or the in position) as shown in FIG. 4, the earth contact 7 may make contact with the ground bus bar 8. Once the arc eliminator 2 is moved to the first position P1 where the extinguisher 11 and the fixed bus bar 6 are connected to each other, the earth contact 7 may be connected to the ground bus bar 8.

When the arc eliminator 2 is in the forward position (or the service position or the in position) as shown in FIG. 3, the earth contact 7 may be disconnected from the ground bus bar 8. Once the arc eliminator 2 is moved to the second position P1 where the extinguisher 11 and the fixed bus bar 6 are disconnected from each other, the earth contact 7 may be disconnected from the ground bus bar 8.

The user, for example, an operator (hereinafter, "user"), may connect the handle to the lead screw 53 of the transport module 5 to get the lead screw 53 in and may turn the handle with hands. Then, the arc eliminator 2 may be moved to the first position P1 or the second position P2 by the transport module 5.

Here, the first position P1 may be the position where the extinguisher 11 is connected to the fixed bus bar 6 and the earth contact 7 is connected to the ground bus bar 8.

The second position P2 may be the position where the extinguisher 11 is disconnected from the fixed bus bar 6 and the earth contact 7 is disconnected from the ground bus bar 8.

Meanwhile, a detection unit (not shown) such as an optical sensor may be installed inside the distribution board D to detect an arc fault. When the detection unit detects an arc fault, an arc protection relay (not shown) installed in the distribution board D may output a control signal to an arc eliminator controller (not shown) installed in the distribution board D.

The arc eliminator controller may put the arc eliminator 2 into a close operation. That is, the arc eliminator controller may put the extinguisher 11 of the arc eliminator into the close operation.

Figure 5:
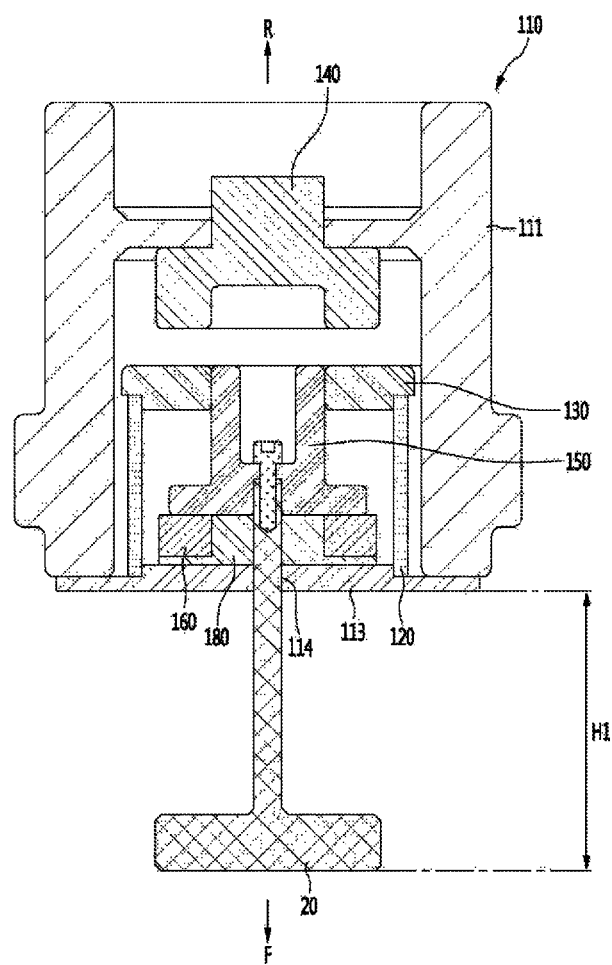
FIG. 5 is a cross-sectional view of an example in which an extinguisher of the arc eliminator is in an open state according to the exemplary embodiment of the present invention.
Figure 6:
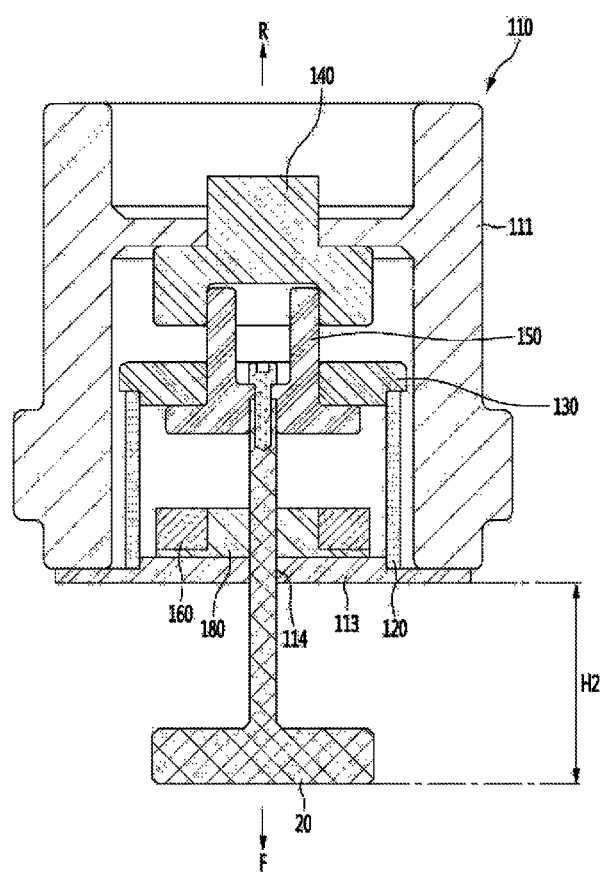
FIG. 6 is a cross-sectional view of an example in which the extinguisher of the arc eliminators is in a closed state according to the exemplary embodiment of the present invention.

FIG. 5 is a cross-sectional view of an example in which an extinguisher of the arc eliminator is in an open state according to the exemplary embodiment of the present invention. FIG. 6 is a cross-sectional view of an example in which the extinguisher of the arc eliminators is in a closed state according to the exemplary embodiment of the present invention.

The extinguisher 30 may be a high-speed closing switch assembly that can be quickly put into the close operation.

The extinguisher 30 may comprise a ground electrode 130 placed inside the case 110, a high-voltage electrode 140 placed inside the case 110, a movable electrode 150 placed inside the case 110, and a movable electrode moving apparatus 160 that causes the movable electrode 150 to move forward or backward.

The extinguisher 30 may comprise a moving rod 20 that moves backward along with the movable electrode 150. Part of the moving rod 20 may be positioned inside the case 110 and connected to the movable electrode 150, and the other part may protrude out from the case 110.

The inside of the case 110 may be sealed and filled with insulating gas. The front and rear sides of the case 110 may be open, as in the embodiment of the present invention. The case 110 may comprise a body portion 111 forming the outer appearance, and a front case 113 formed at the front of the body portion 111 to cover the open front side of the body portion 111.

The extinguisher 30 may further comprise a pipe 120 placed inside the case 110. The pipe 120 may be positioned at the back of the front case 113, and may be placed to cover at least part of the ground electrode 130. As well as covering and protecting the ground electrode 130, the pipe 120 serves as a conductor because it is made of a conductive material.

The ground electrode 130 may be attached to the back of the pipe 120.

The high-voltage electrode 140 may be provided on the back of the inside of the case 110.

The high-voltage electrode 140 and the ground electrode 130 may be placed horizontally apart inside the case 110.

The ground electrode 130 may be directly connected to the earth contact 7 shown in FIGS. 3 and 4, or electrically connected to the earth contact 7 through a separate connector.

As shown in FIGS. 3 and 4, the high-voltage electrode 140 may make direct contact with the fixed bus bar 6 installed inside the distribution board, or make contact with the fixed bus bar 6 through a separate connector.

The movable electrode 150 may be movable within the case 110.

Within the case 110, the movable electrode 150 may move to the open position where the ground electrode 130 and the high-voltage electrode are not connected to each other, as shown in FIG. 5, and move to the input position where the ground electrode 130 and the high-voltage electrode 140 are connected to each other, as shown in FIG. 6.

The movable electrode 150 may move horizontally within the case 110 while making contact with the inner wall of a hollow of the ground electrode 130. The movable electrode 150 may move in a forward direction F to the open position and in a backward direction R to the input position.

The movable electrode moving apparatus 160 may comprise an actuator that causes the movable electrode 150 to move backward.

The actuator may be controlled by an arc eliminator controller (not shown) installed in the distribution board D. When an input signal is input into the actuator from the ac eliminator controller, this generates an electromagnetic force, causing the movable electrode 150 to move linearly.

The actuator may be a Thomson coil actuator. The Thomson coil actuator may be made with a coil wound into a ring shape. When power is applied to the Thomson coil actuator, the Thomson coil actuator may generate an electromagnetic force.

Once power is applied to the Thomson coil actuator, current flows through the coil wound into a ring shape and generates an electromagnetic force. By the electromagnetic force, the movable electrode 150 may move from the open position to the input position or vice versa.

The actuator may be provided on a support member 180 placed on the back side of the front case 113 of the case 110.

Electrical circuits in an incoming panel, distribution board, or incoming power distribution switchboard may be connected to ground by the high-voltage electrode 140, ground electrode 130, and movable electrode 150. Also, when a fault current such as an arc occurs on an electrical circuit, the fault current does not flow through the electrical circuit but instead may bypass and flow quickly to ground.

One end of the moving rod 20 may be attached to the movable electrode 150, and the other end may protrude out from the case 110. The front case 113 of the case 110 may be perforated with a through hole 114 for passing the moving rod 20 through. The moving rod 20 is inserted through the through hole 114 so that part of it is fixed and connected to the movable electrode 150 and the other part protrudes out from the case 110.

As illustrated in FIG. 6, once the movable electrode 150 is moved to the input position, part of the moving rod 20 is protruding out from the case 110.

As illustrated in FIG. 5, once the movable electrode 150 is placed in the open position, the moving rod 20 is protruding a first length H1 out from the case 110.

As illustrated in FIG. 6, when the movable electrode 150 is moved to the input position, the moving rod 20 moves into the case 110 along with the movable electrode 150. Then, the moving rod 20 may protrude out from the case 110 a second length H2, which is shorter than the first length H1 by the distance the movable electrode 150 has moved.

Meanwhile, the arc eliminator 1 may be equipped with a moving rod driving mechanism (not shown) that pushes the moving rod 20 in the forward direction F. The moving rod driving mechanism may move the moving rod 20 in the forward direction F, so that the movable electrode 150 fixed and connected to one end of the moving rod 20 is moved to the open position shown in FIG. 5.

Figure 7:
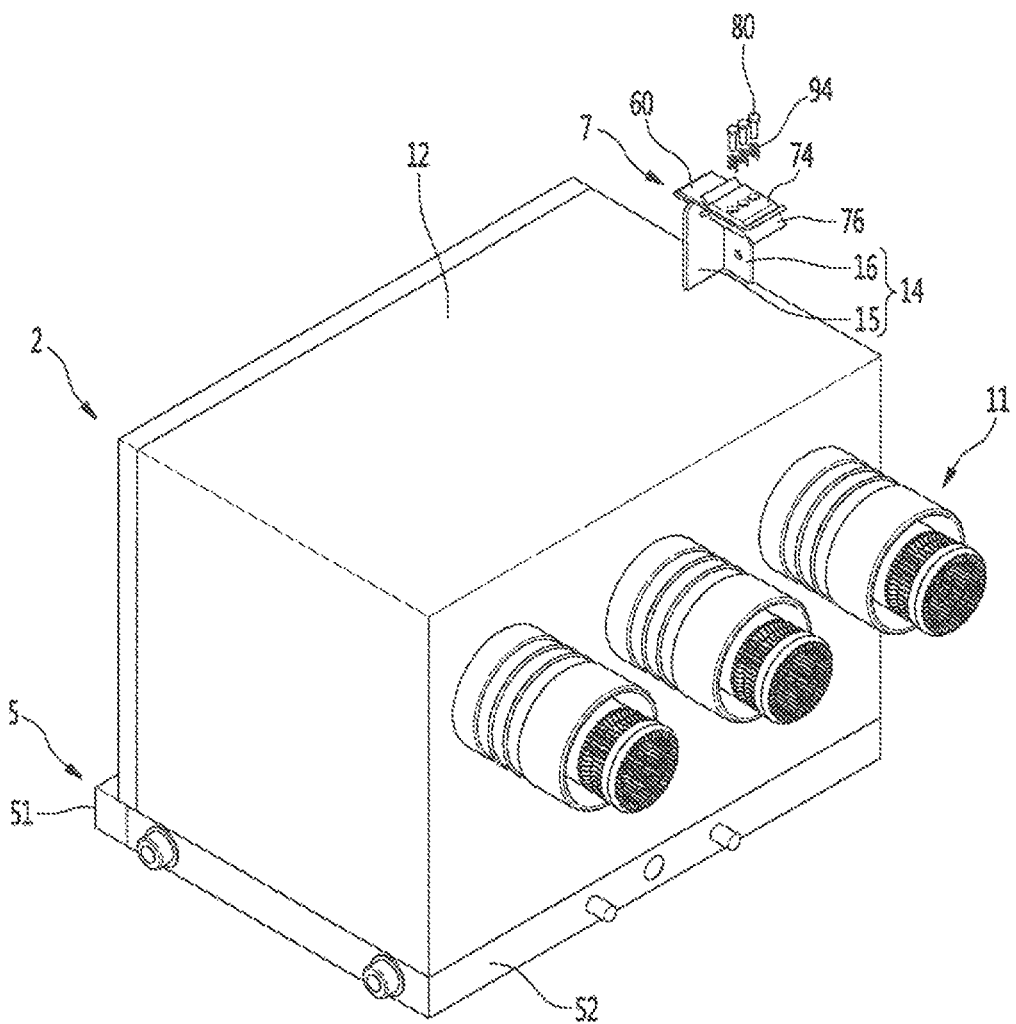
FIG. 7 is a partially exploded perspective view illustrating the arc eliminator of FIG. 6.
Figure 8:
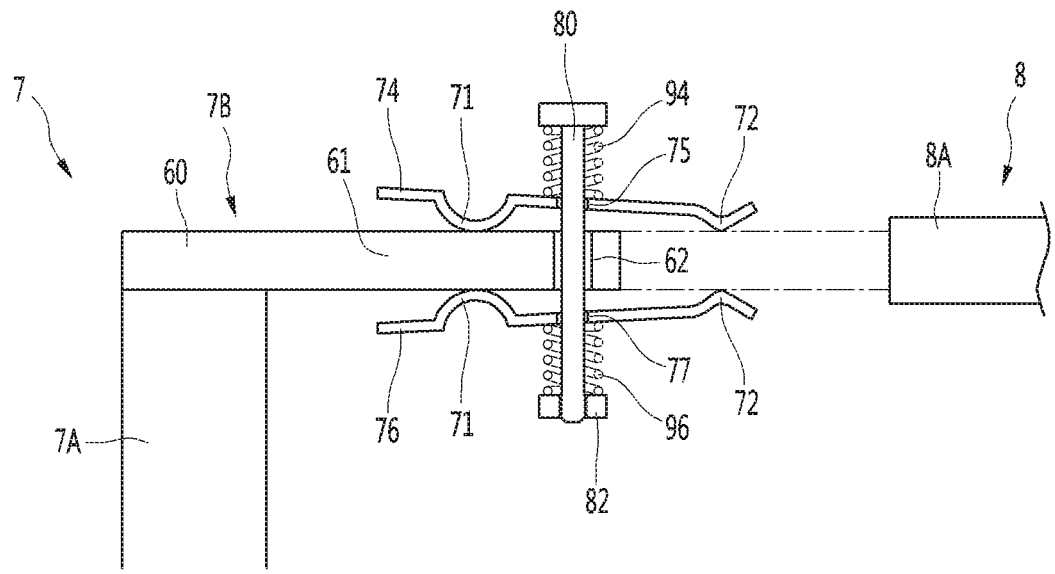
FIG. 8 is an enlarged cross-sectional view illustrating the earth contact of FIG. 7 when the earth contact is disconnected from the ground bus bar.
Figure 9:
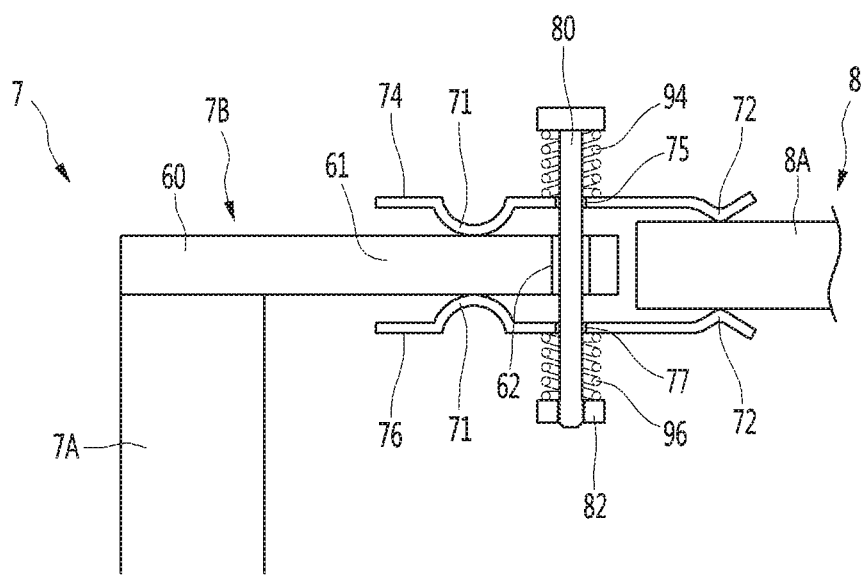
FIG. 9 is an enlarged cross-sectional view illustrating the earth contact and ground bus bar when the earth contact of FIG. 7 is connected to the ground bus bar.

FIG. 7 is a partially exploded perspective view illustrating the arc eliminator of FIG. 6. FIG. 8 is an enlarged cross-sectional view illustrating the earth contact of FIG. 7 when the earth contact is disconnected from the ground bus bar. FIG. 9 is an enlarged cross-sectional view illustrating the earth contact and ground bus bar when the earth contact of FIG. 7 is connected to the ground bus bar.

The earth contact 7 may comprise: a fixed ground member 60; and at least one movable ground member installed in contact with the fixed ground member 60.

The fixed ground member 60 may comprise the vertical portion 7A of FIG. 2, and may be part of the horizontal portion 7B of FIG. 2. The fixed ground member 60 may be supported on the earth contact support 14, and may allow the movable ground member to be supported on it, spaced apart from the housing 12.

The movable ground member may have a first contact portion 71 that makes contact with the fixed ground member 60 and a second contact portion 72 that makes contact with the ground bus bar 8.

The first contact portion 71 may be in constant contact with the fixed ground member 60, regardless of the connection to or disconnection from the ground bus bar 8. The first contact portion 71 may comprise a bulge protruding on the side of the movable ground member facing the fixed ground member 60. It is desirable that the surfaces of the first contact portion 71 contacting the fixed ground member 60 is curved so that the movable ground member rotates on the first contact portion 71.

The second contact portion 72 may make contact with the ground bus bar 8 when the arc eliminator 2 is in the first position, and may be spaced apart from the ground bus bar 8 when the arc eliminator 2 is in the second position.

The second contact portion 72 may comprise a protrusion protruding on the side of the movable ground member facing the ground bus bar 8. The second contact portion 72 may be spaced apart from the first contact portion 71. The first contact portion 71 and the second contact portion 72 may be positioned apart from each other in a direction parallel to the direction the arc eliminator 2 moves backward. It is desirable that the second contact portion 72 is shaped in a way that makes the initial insertion of the ground bus bar 8 easy.

The earth contact 7 may be placed such that one movable ground member makes contact with the fixed ground member 60. In this case, the ground bus bar 8 may slide in between one movable ground member and the fixed ground member 60, thereby enabling it to come into contact with the movable ground member or with both the movable ground member and the fixed ground member 60.

The earth contact 7 may be placed such that a plurality of movable ground members 74 and 76 make contact with the fixed ground member 60. In this case, the ground bus bar 8 may slide in between the movable ground members 74 and 76, thereby enabling it to come into contact with at least one of the plurality of movable ground members 74 and 76

The earth contact 7 may comprise a pair of movable ground members 74 and 76. The pair of movable ground members 74 and 76 may be placed to face each other.

Part of the fixed ground member 60 may be positioned between the pair of movable ground members 74 and 76. The part of the fixed ground member 60 placed between the pair of movable ground members 74 and 76 may be a contact portion 61.

Part of the ground bus bar 8 may be positioned between the pair of movable ground members 74 and 76. A contact portion 8A of the ground bus bar 8 may be positioned between the pair of movable ground members 74 and 76. At least part of the contact portion 8A of the ground bus bar 8 may slide in between the pair of movable ground members 74 and 76 and come into contact with the pair of movable ground members 74 and 76.

That is, the pair of movable ground members 74 and 76 may be spaced apart from each other, with part of the fixed ground member 60 and part of the ground bus bar 8 in between them.

The earth contact 7 may further comprise: a connecting member 80 and 82 that connects the movable ground members 74 and 76 to the fixed ground member 60; and an elastic member 94 and 96 that is installed between the connecting member 80 and 82 and the movable ground members 74 and 76 and elastically supports the movable ground members 74 and 76.

The connecting member 80 and 82 may comprise a first connecting member 80 that penetrates the movable ground members 74 and 76 and the fixed ground member 60, and a second connecting member 82 that is fastened to the part of the first connecting member 80 penetrating the movable ground members 74 and 76 and the fixed ground member 60. The first connecting member 80 may have a head portion 81. The first connecting member 80 may be a bolt with the head portion 81, and the second connecting member 82 may be a nut that is screwed onto the side opposite to the head portion of the bolt.

One 74 of the pair of movable ground members 74 and 76 may be perforated with a first through hole 75, the part 61 of the fixed ground member 60 positioned between the pair of movable ground members 74 and 76 may be perforated with a second through hole 62, and the other one 66 of the pair of movable ground members 74 and 76 may be perforated with a third through hole 77.

The first connecting member 80 may be placed to pass through the first through hole 75, second through hole 62, and third through hole 77, and the second connecting member 82 may be fastened to the part of the first connecting member 80 that passes through all of the first through hole 75, second through hole 62, and third through hole 77.

One elastic member may be installed in a way that pushes one 74 of the pair of movable ground members 74 and 76 towards the other movable ground member 76, and the other one of the pair of movable ground members 74 and 76 may be supported on the connecting member 80 and 82 while making contact with them. In this case, the movable ground member 74 may be supported on the elastic member, and the gap between the pair of movable ground members 74 and 76 may be widened when the ground bus bar 8 slides in between them.

The gap between the two movable ground members 72 and 74 may be widened. The elastic member may comprise a first elastic member 94 that pushes one 74 of the pair of movable ground members 74 and 76 towards the other movable ground member 76.

The elastic member may be provided for each of the movable ground members 74 and 76. The elastic member may comprise a second elastic member 96 that pushes the other movable ground member 76 towards one 76 of the pair of movable ground members 74 and 76. In this case, one 74 of the movable ground members 74 and 76 may be supported on the first elastic member 94, the other movable ground member 76 may be supported on the second elastic member 96, and when the ground bus bar 8 slides in, the gap between the pair of movable ground members 74 and 76 may be widened, supported on the elastic members, respectively.

The first elastic member 94 may be placed between one surface of one 74 of the pair of movable ground members 74 and 76 and the head portion 81 of the first connecting member 80, and may elastically support one 74 of the pair of movable ground members 74 and 76 in the opposite direction of the head portion 81.

The second elastic member 96 may be placed between one surface of the other movable ground member 76 and the second connecting member 82, and may elastically support the other movable ground members 76 in the opposite direction of the second connecting member 82.

One 74 of the pair of movable ground members 74 and 76 may be an upper ground member that is brought into contact with the fixed ground member 60 above the fixed ground member 60, and the first elastic member 94 may be an upper spring that is brought into contact with the upper side of the upper ground member.

The other movable ground member 76 may be a lower ground member that is brought into contact with the fixed ground member 60 below the fixed ground member 60, and the second elastic member 96 may be a lower spring that is brought into contact with the lower side of the lower ground member.

The ground bus bar 8 may slide in between the pair of movable ground members 74 and 76 while the arc eliminator 2 is moving toward the first position. In this case, the ground bus bar 8 may slide in between the second contact portions 72 of the pair of movable ground members 74 and 76. The ground bus bar 8 may slide smoothly in between the pair of movable ground members 74 and 76 through the second contact portions 72 spaced far apart from each other, and may slide in deeply between the pair of movable ground members 74 and 76 while maintaining contact with the second contact portions 72 during the movement of the arc eliminator 2.

When the ground bus bar 8 slides in, the gap between the pair of movable ground members 74 and 76 may be widened. In this case, the pressure from the first elastic member 94 may be exerted on one 74 of the pair of movable ground members 74 and 76, and the pressure from the second elastic member 96 may be exerted on the other movable ground member 76. The pair of movable ground members 74 and 76 may remain in close contact with the ground bus bar 8 by the pressures exerted by the elastic members, and the ground bus bar 8 may be firmly connected to the pair of movable ground members 74 and 76 by the tightness of the pair of movable ground members 74 and 76.

Meanwhile, while the arc eliminator 2 is moving towards the second position, the ground bus bar 8 may slide out from between the pair of movable ground members 74 and 76, through the second contact portions 72 of the pair of movable ground members 74 and 76.

When the ground bus bar 8 is disconnected, the pressure from the first elastic member 94 may be exerted on one 74 of the pair of movable ground members 74 and 76, and the pressure from the second elastic member 96 may be exerted on the other movable ground member 76. The gap between the pair of movable ground members 74 and 76 may be narrowed.

The above description is merely intended to illustratively describe the technical spirit of the present invention, and those skilled in the art to which the present invention pertains, various changes and modifications may be possible without departing from the essential features of the present invention.

Therefore, the embodiments disclosed in the present invention are not intended to limit the technical spirit of the present invention and are merely intended to describe the present invention, and the technical spirit of the present invention is not limited by those embodiments of the present invention.

The scope of protection of the present invention should be interpreted by the accompanying claims, and all technical spirits in equivalents thereof should be interpreted as being included in the scope of the present invention.

What is claimed is:

1. An arc eliminator comprising:
   a housing;
   an extinguisher installed on the housing; and
   an earth contact installed on and protruding from the housing,
   wherein the earth contact is connected to a ground bus bar inside a distribution board when the extinguisher is moved to a first position in which the extinguisher is connected to a fixed bus bar inside the distribution board,
   wherein the earth contact is disconnected from the ground bus bar when the extinguisher is moved to a second position in which the extinguisher is disconnected from the fixed bus bar,
   wherein the earth contact comprises:
   a fixed ground member; and
   a movable ground member having a first contact portion in constant contact with the fixed ground member and a second contact portion in selective contact with the ground bus bar,
   wherein the first contact portion comprises a protruding bulge on a side of the movable ground member facing the fixed ground member, and
   wherein the second contact portion comprises a protrusion on a side of the movable ground member facing the ground bus bar.

2. The arc eliminator of claim 1, wherein:
   the second contact portion contacts the ground bus bar when the extinguisher is in the first position; and
   the second contact portion is disconnected from the ground bus bar when the extinguisher is in the second position.

3. The arc eliminator of claim 1, wherein the earth contact further comprises:
   a connecting member connecting the movable ground member to the fixed ground member; and
   an elastic member that is installed between the connecting member and the movable ground member and elastically supports the movable ground member.

4. The arc eliminator of claim 1, further comprising a pair of movable ground members facing each other, wherein a portion of the fixed ground member is positioned between the pair of movable ground members.

5. The arc eliminator of claim 3, wherein the elastic member comprises:
   a first elastic member that pushes a first of the pair of movable ground members towards a second of the pair of movable ground members; and
   a second elastic member that pushes the second of the pair of movable ground members towards the first of the pair of movable ground members.

6. The arc eliminator of claim 1, wherein further comprising an earth contact support that is installed on the housing and supports the earth contact.

7. The arc eliminator of claim 6, wherein the earth contact support comprises:
   a vertical portion; and
   a horizontal portion that is bent horizontally from a top of the vertical portion, is spaced apart from the housing and contacts the ground bus bar.

* * * * *